H. B. KING.
Toy-Whistle.
No. 167,672.  Patented Sept. 14, 1875.
Fig: 1.
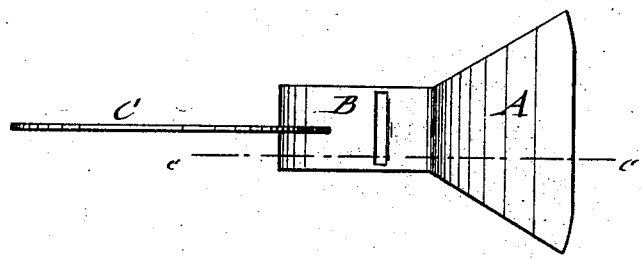
Fig: 2.
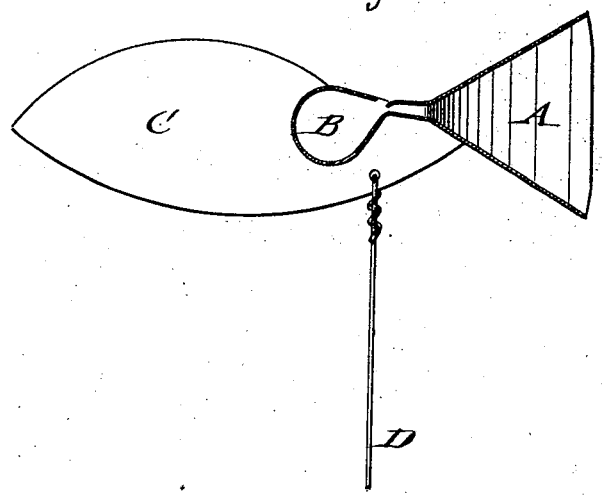
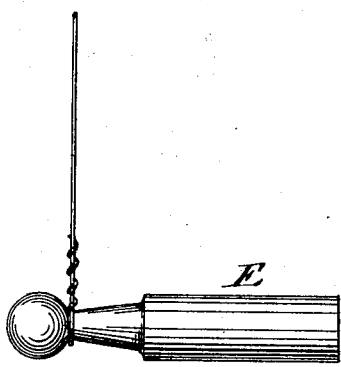
WITNESSES:  INVENTOR:
Chas. Nida  H. B. King
A. F. Terry  BY
  ATTORNEYS.

UNITED STATES PATENT OFFICE.

HENRY B. KING, OF PATERSON, NEW JERSEY.

IMPROVEMENT IN TOY WHISTLES.

Specification forming part of Letters Patent No. 167,672, dated September 14, 1875; application filed July 17, 1875.

*To all whom it may concern:*

Be it known that I, HENRY B. KING, of Paterson, in the county of Passaic and State of New Jersey, have invented a new and Improved Toy Whistle, of which the following is a specification:

In the accompanying drawing, Figure 1 represents a top view, and Fig. 2 a side view, partly in section, on line c c, Fig. 1, of my improved toy whistle.

Similar letters of reference indicate corresponding parts.

My invention relates to an improved toy whistling device, by which a whistling or musical sound, that is less annoying to the ear than the common whistle, is produced; and the invention consists of a whistle or reed with funnel-shaped mouth and guide-wing, the whole attached to a cord and whirled through the air to produce the sound.

In the drawing, B represents a whistle or reed, to which the air is conveyed by a funnel-shaped mouth, A, that opens by a narrow slit or aperture into the whistle or reed part. A wing or vane, C, extends symmetrically in longitudinal direction from funnel and whistle at such width and length that the device when whirled around is guided steadily through the air. The whistle is attached by a cord, D, to a handle, E, and operated by being whirled through the air. The wing or vane keeps the mouth steadily against the wind, and produces thereby the sound, which, if more than one whistle or reed be used, may be varied so as to be harmonious and pleasant to the ear.

Having thus described my invention, I claim as new and desire to secure by Letters Patent—

1. The toy whistle herein described, having the flaring or funnel-shaped mouth A and the vane C, all arranged as and for the purpose described.

2. The whistle or reed B, flaring mouth A, vane C, cord or wire D, and handle E, substantially as described.

HENRY B. KING.

Witnesses:
PAUL GOEPEL,
T. B. MOSHER.